United States Patent

[11] 3,598,972

[72] Inventor William C. Choate
Dallas, Tex.
[21] Appl. No. 786,059
[22] Filed Dec. 23, 1968
[45] Patented Aug. 10, 1971
[73] Assignee Texas Instruments Incorporated
Dallas, Tex.

[54] ADAPTIVE WEIGHTING IN TRAINING FEEDBACK MINIMIZED OPTIMUM FILTERS AND PREDICTORS
8 Claims, 6 Drawing Figs.

[52] U.S. Cl. .......... 235/150.1, 235/172.5
[51] Int. Cl. .......... G05 13/02
[50] Field of Search .......... 235/150, 150.1, 172.5

[56] References Cited

UNITED STATES PATENTS 3,174,031 3/1965 Hartmanis et al. .......... 235/150

*Primary Examiner*—Eugene G. Botz
*Attorneys*—Samuel M. Mims, Jr., James O. Dixon, Andrew M. Hassell, Harold Levine, Rene E. Grossman, Melvin, Sharp and Richards and Harris & Hubbard

ABSTRACT: Training control is provided for a nonlinear adaptive signal processor wherein, during a long training phase on a nonstationary function, but based upon a prior knowledge of the desired processor response to a given input, the inertia to change established during long training is modified by production and utilization of variable error dependent gain control.

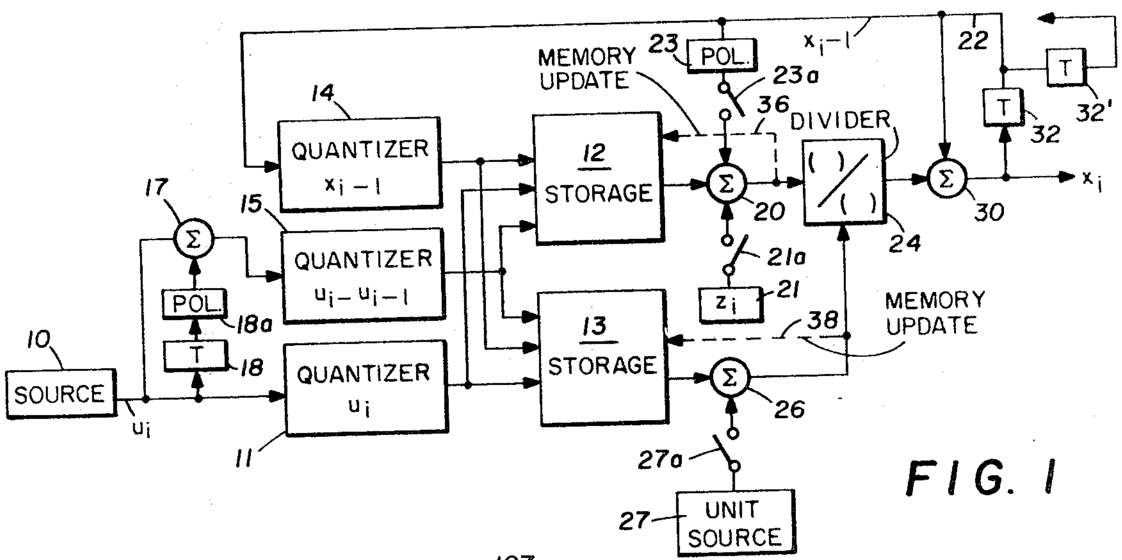
FIG. 1
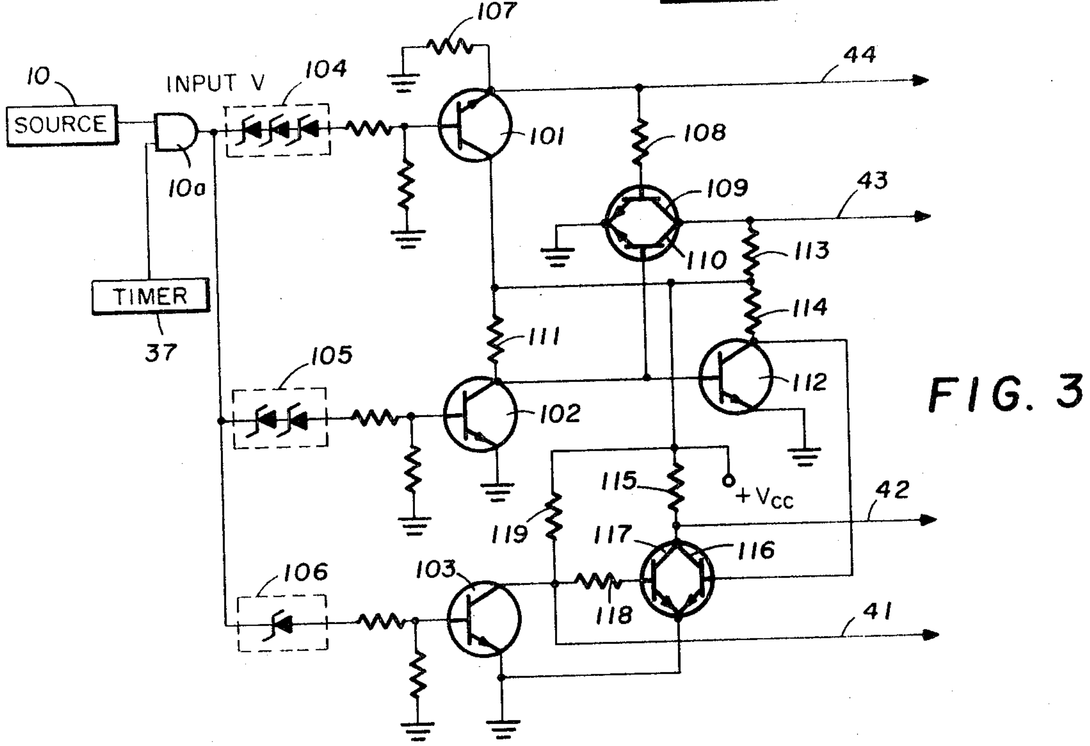
FIG. 3
| INPUT VOLTAGE* | | | OUTPUT VOLTAGE** | | | |
|---|---|---|---|---|---|---|
| $>V_1$ | $>V_2$ | $>V_3$ | 41 | 42 | 43 | 44 |
| 0 | 0 | 0 | 1 | 0 | 0 | 0 |
| 1 | 0 | 0 | 0 | 1 | 0 | 0 |
| 1 | 1 | 0 | 0 | 0 | 1 | 0 |
| 1 | 1 | 1 | 0 | 0 | 0 | 1 |
* 0: "NO"
1: "YES"
** 0: ≈ 0 VOLTS
1: ≈ $V_{cc}$ VOLTS
FIG. 4
INVENTOR
WILLIAM C. CHOATE
D. Carl Richards
ATTORNEY

ADAPTIVE WEIGHTING IN TRAINING FEEDBACK MINIMIZED OPTIMUM FILTERS AND PREDICTORS

This invention relates to use of adaptive weighting during training of feedback minimized optimum filters and predictors.

Optimal nonlinear processors are highly useful in connection with problems of most challenging nature including identification, control, filtering, smoothing, prediction, modeling, and classification.

The design of optimum linear processors and predictors according to a mean square error criterion is well known in the art. Such systems are theoretically discussed by Norbert Wiener in his work entitled "The Fourier Integral and Certain of its Applications" published in 1933 by Dover Publications Inc. Wiener has also discussed the realization of a nonlinear system. The theoretical aspects of the Wiener theory of nonlinear system characterization may be employed in the manner disclosed in the thesis of Amar G. Bose, Massachusetts Institute of Technology, June 1956, entitled "A Theory of non-linear Systems," reproduced in M.I.T. Research Laboratories of Electronics Technical Report No. 309.

The use of the Wiener theory is further disclosed by Bose in systems and methods described and claimed in Bose U.S. Pat. No. 3,265,870 issued Aug. 9, 1966.

In applicant's pending application Ser. No. 732,152 filed May 27, 1968, a practical and realizable Wiener nonlinear processor is disclosed based upon implementation. Said pending application is incorporated herein by reference.

Bose U.S. Pat. No. 3,265,870 makes clear that, as the complexity of the processor is increased, the number of filter coefficients necessary to specify the processor grows very rapidly.

Applicant minimized the system complexity beyond any level postulated by Bose but without sacrificing the capability of the filter, employing a processor output signal in a unique feedback structure whereby the number of coefficients to be evaluated is reduced. In that system successive time samples of an input function $u$ were quantized to produce members of successive groups of address functions for controlling a gating operation which in response to each of the groups produced an independent gating output signal. The gating output signal related to the contemporary value $u_i$ of the signal $u$ was combined with a second signal $z_i$ representative of the contemporary value of the desired processor response $x_i$ to the input $u$ and with a third signal $-x_{i-1}$. The resultant combined signal was stored at the selected address and, further, was normalized and combined with said third signal $-x_{i-1}$ to form the processor output signal $x_i$. At the same time the third signal $-x_{i-1}$ was quantized to produce a second member of each of the groups of the functions for controlling the gating operation. The input $u_i$, desired output $zi$, and previous actual output $x_{i-1}$ each represented a sample of a single valued time function or a multiplicity of such functions.

In such operations where the training functions employed are stationary, it has been found to be advantageous to train the system with uniform weighting given to the training points of equal credibility. However, in nonstationary operations to which the present invention pertains uniform weighting is not desirable. This is for the reason that after the processor is trained over a long interval considerable inertia is built up to further adaption in any interval short with respect to the preceding training interval. The present invention is directed to the adaptive weighting of the training points in accordance with an error signal which represents the difference between the desired output and certain values stored in the processor.

In accordance with the invention, a method and system are provided for adaptive weighting of an optimum filter during training on training functions including at least one system input signal to minimize inertia to response after long training. An error signal is generated which is representative of the difference between an actual response of the processor to the input signal and the desired response.

The contribution in the subsequent training of the processor of the training functions other than the system input signal is controlled in dependence upon and in response to the error function.

For a more complete understanding of the present invention and for further objects and advantages thereof, reference may now be had to the following description taken in conjunction with the accompanying drawings in which;

FIG. 1 is a block diagram of one embodiment of a system in which the present invention is employed;

FIG. 3 illustrates a four-level quantizer circuit;

FIG. 4 is a table illustrating the operation of the circuit in FIG. 3;

Figure 2:
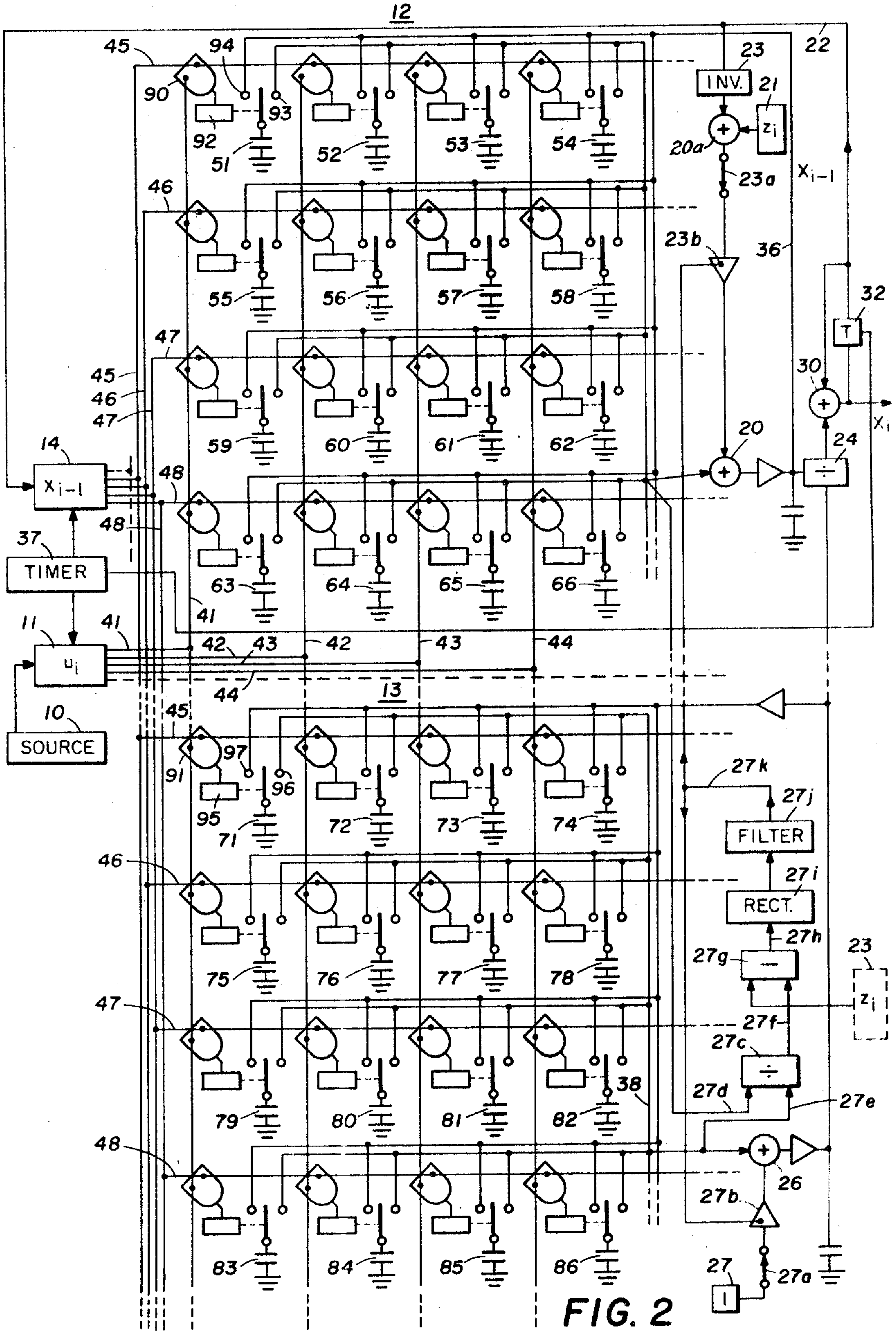
FIG. 2 is a diagram illustrating an analog form of optimum process or in which generation of an adaptive control function is shown.

Before describing adaptive weighting during training, the nonlinear processor disclosed and claimed in said application Ser. No. 732,152 will first be described. FIG. 1 illustrates a nonlinear processor which may be trained for optimum processing of single valued time varying function $u$ characterized by two components $u(t)$ and $[u(t)-u(t-T)]$ in the manner disclosed in a generic sense in the Bose U.S. Pat. No. 3,265,870. Provision is made, however, for reducing the required storage by many orders of magnitude.

In the following description, the use of a bar under a given symbol, e.g.$\underline{u}$, signifies that the signal so designated is a multicomponent signal, e.g.:$u(t)$ and $u(t)-u(t-T)$. The improvement in the processor is accomplished through the use of a feedback operation which at any one instant requires only one sample of each of the two components of the input signal $\underline{u}$ and thus materially minimizes the storage problem. As in the Bose patent, the processor is trained in dependence upon some known or assumed function $z$ which is a desired output such that the output function $x$ corresponds with $z$ for inputs having statistics similar to $u$. Thereafter the processor will respond to signals $u'$, $u''$, etc. in an optimum manner. In the following description, the training phase will first be discussed following which the changes to carry out operations on signals other than that used for training will be described.

TRAINING

In FIG. 1 the first component of signal $\underline{u}$ from a source 10 forms the input to a quantizer 11. The output of quantizer 11 is connected to each of a pair of storage units 12 and 13. The storage units 12 and 13 will in general have like capabilities and will both be jointly addressed by signals in the output circuits of the quantizer 11 and quantizers 14 and 15. The storage units 12 and 13 are multielement storage units capable of storing different electrical quantities at a plurality of different addressable storage locations, either digital or analog.

The third quantizer 15 has been illustrated also addressing both storage units 12 and 13 in accordance with the second component of the signal $\underline{u}$ derived from source 10, the delay 18 and the inversion unit 18*a*. More particularly, if the signal sample $u_i$ is the contemporary value of the signal from source 10 then the input applied to quantizer 15 is $u_i-u_{i-1}$. This input is produced by applying to a summing unit 17 $u_i$ and the negative of the same signal delayed by one sample increment in the delay unit 18. For such an input, the storage units 12 and 13 may be regarded as three-dimensional matrices of storage elements. In the description of FIG. 1 which immediately follows, the quantizer 15 will be ignored and will be referred to later.

The output of storage unit 12 is connected to an adder 20 along with the output of a unit 21 which is a signal $z_i$, the contemporary value of the desired output signal. A third input is connected to the adder 20 from a feedback channel 22, the latter being connected through an inverting unit 23 which changes the sign of the signal.

The output of adder 20 is connected to a divider 24 to apply a dividend signal thereto.

The divisor is derived from storage unit 13 whose output is connected to an adder 26. A unit amplitude source 27 is also connected at its output to adder 26. The output of adder 26 is connected to the divider 24 to apply the divisor signal thereto. A signal representative of the quotient is then connected to an adder 30, the output of which is contemporary value $x_i$ the processor output. The adder 30 also has a second input derived from the feedback channel 22. The feedback channel 22 transmits the processor output signal $x_i$ delayed by one unit time interval in the delay unit 32, i.e., $x_{i-1}$. The feedback channel 22 is connected to the input of the quantizer 14 to supply the input signal thereto.

A feedback channel 36 leading from the output of adder 20 to the storage unit 12 is provided to update the storage unit 12. Similarly a channel 38 leading from the output of adder 26 is connected to storage unit 13 and employed to update memory 13.

During the training phase, neglecting the presence of quantizer 15, the system operates as will now be described. The contemporary value $u_i$ of the signal $u$ from source 10 is quantized in unit 11 simultaneously with quantization of the preceding output signal $x_{i-1}$ (which may initially be zero) by quantizer 14. The latter signal is provided at the output of delay unit 32 whose input-output functions may be related as follows:

$T$ is the delay in seconds, $$x_i = x(iT+t_o), \text{ and} \qquad (1)$$

$$x_{i-1} = x[(i-1)T+t_o], \qquad (2)$$

where $i$ is an integer, $T$ is the sampling interval, and $t_o$ is the time of the initial sample. The two signals thus produced by quantizers 11 and 14 are applied to both storage units 12 and 13 to select in each unit a given storage cell. Stored in the selected cell in unit 12 is a signal representative of previous values of the output of adder 20 as applied to this cell by channel 36. Stored in the corresponding cell in unit 13 is a condition representative of the number of times that that cell has previously been addressed, the contents being supplied by way of channel 38. Initially all signals stored in both units 12 and 13 may be zero. The selected stored signals derived from storage array 12 are applied synchronously to adder 20 along with $z_i$ and $-x_{i-1}$ signals.

The contemporary output of adder 20 is divided by the output of adder 26 and the quotient is summed with $x_{i-1}$ in adder 30 to produce the contemporary processor response $x_i$. The contemporary value $x_i$ is dependent on the contemporary value $u_i$ of $u$, the contemporary value $z_i$ of the desired output $z$ and negative of $x_{i-1}$, i.e.: $(-x_{i-1})$, as well as the signals from the addressed storage cells.

It will be found that upon analysis the system functions in a manner which may be described in the following terms involving a differential equation in vector form. A nonlinear system may be characterized by a vector differential equation $$\dot{\underline{x}} = \underline{g}(\underline{x}, \underline{u}, t) \qquad (3)$$

That is, $\dot{\underline{x}}$ is the time derivative of the signal $\underline{x}$ and is a vector-valued function, $\underline{g}$, of $\underline{x}$, $\underline{u}$, and $t$. The function $\underline{g}$ in a theoretical sense describes the system and may allow the first order vector-valued differential equation (3) to represent a system governed by a differential equation of multiorder. In important cases of stationary systems, time does not appear as a parameter of $\underline{g}$. This will be the case for the systems considered first herein.

By choosing the time increment $T$ sufficient small, the variation of $\underline{x}(t)$ can be made small in any interval $(t, t-T)$, subject only to reasonable physical constraints. Then equation (3) can be approximated.

$$\underline{x}_i = T\underline{g}(x_{i-1}, u_i) + x_{i-1} \qquad (4)$$

Here the problem is to determine the first element on the right of equation (4). The feedback provision of the present invention can be shown to proceed for determination of the optimum operation $T\underline{g}$ of equation (4).

The functions above described in connection with the system of FIG. 1 provide the signal $\underline{x}_i$ automatically.

POSTTRAINING OPERATION

The system shown in FIG. 1 establishes voltage conditions which represent the optimum nonlinear processor for treating signals having the same statistics as the signal $z(t)$ upon which the training is based.

After the system has been trained based upon the desired output $z$ over a statistically significant sequence of $u$ and $z$, the switches 21a, 23a and 27a may then be opened and a new input signal $u'$ employed whereupon the processor operates optimally on the signal u' in the same manner as above described but with the three signals $z_i$, $x_{i-1}$ and unity no longer needed within the update channels.

In the system as shown in FIG. 1, quantizer 15 provides an output dependent upon the differences between sequential samples $u_i$ and $u_{i-1}$, employing a delay unit 18 and a polarity reversal unit 18a. In this system a single delay unit 18 is provided at the input and a single delay unit 32 is provided at the output. In general, more delays could be employed on both input and output. However, physical considerations will generally require that there will not be required more delay units on the input than on the output. Further, if the system is responsive to pass low frequencies selectively, relative to high frequencies, then fewer delays would be required on the input than on the output. In use of the system with quantizer 15, storage units 12 and 13 may conveniently be regarded as three dimensional. Of course, elements of the input vector and the output vector need not be related by simple time delays as will be subsequently shown in FIG. 6. The system above described is of the type to which the present invention pertains.

FIG. 2

In FIG. 2, a processor is shown in greater detail with means for development and use of an adaptive weighting function in accordance with this invention.

It will be noted that the third quantizer 15 of FIG. 1 has been eliminated. Storage elements 12 and 13 are depicted as two-dimensional arrays of storage elements in the form of electrical capacitors. Where appropriate, parts of FIG. 2 have been given the same reference characters as in FIG. 1.

In FIG. 2 electrical charges are placed on the capacitors which are, in part, selected by voltage states on lines 41—44 leading from quantizer 11. Lines 41—44 extend vertically through the arrays of storage elements in units 12 and 13. The capacitor selections are then completely specified by voltage states on lines 45—48 leading from quantizer 14. The latter lines extend horizontally through the storage units 12 and 13. Quantizers 11 and 14 operate as disclosed in Bose U.S. Pat. No. 3,265,870 so that only one of the lines from each quantizer will be energized at any one time. Quantizers 11 and 14 are controlled by a timer 37. Each storage element is provided with control circuits to control the signal to be transmitted from a given capacitor and the charge placed on a given capacitor.

The storage units 12 and 13 are illustrated as comprising a 4×4 array which may form a part of larger arrays as indicated by the dotted terminations of the electrical grid conductors.

In storage unit 12, capacitors 51—66 are employed. In storage unit 13, capacitors 71—86 are employed. One pair of capacitors is selected or addressed each time a sample of the input signal $u_i$ is employed, selection being by the outputs of units 11 and 14. They are addressed by enabling AND gates such as gates 90 and 91. Gates 90 and 91 each have one input connected to bus 41 leading from quantizer 11 and another input connected to bus 45 leading from quantizer 14. The output of gate 90 controls a switch actuator 92 which serves sequentially to cause closure of switch terminal 93 and then switch terminal 94. Similarly, gate 91 controls a switch actuator 95 which operates to close switch terminal 96 and then switch terminal 97. Closure of switch terminal 93 applies the voltage on capacitor 51 to adder 20 each time the AND gate 90 is enabled. Following the latter action, switch terminal 94 is closed to apply to the capacitor an additional charge proportional to the value of the voltage at the input to divider 24 to update the quantity stored on capacitor 51.

Gate 91 is enabled coincident with AND gate 90, thus causing switch terminal 96 to close. This applies voltage to adder 26 proportional to the charge on capacitor 71. Thereafter, switch terminal 96 is opened and switch terminal 97 is closed to update the charge on capacitor 71 by applying thereto a voltage representative of the output of adder 26. The output of adders 20 and 26 are applied to divider 24. The output of divider 24 together with the output of delay unit 32 is then applied to adder 30 whose output is the desired filter output $x_i$. It will be noted that the timer 37 controls the sampling interval in quantizers 11 and 14 and also controls the delay unit 32.

ADAPTIVE WEIGHTING

Adaptive weighting of the present invention is applicable to the Bose system as well as applicant's improved system and will be described in connection with the latter. It will be noted in FIG. 2 that the output $x_{i11}$ is applied to adder 20 by way of an inversion unit 23 and an adder 20*a* the output of which is applied through a gain-controlled amplifier 23*b*. The $z_i$ source 21 is connected to the adder 20*a* so that the combined signals (a signal representing the current value of the desired output from source $z_i$ and the delayed output $x_{111}$) i—1) are subject to the gain control function applied to the amplifier 23*b*.

In the similar manner the unit source 27 is connected by way of switch 27*a* and gain control amplifier 27*b* to adder 26. Amplifier 27*b* is controlled by the same gain control voltage as amplifier 23*b*.

In accordance with the present invention, the gain control function $g_i$ is a weighting function which is varied in dependence upon an error function. This permits the system to respond to the presence of substantial errors even though the filter has undergone training for a long period of time.

In FIG. 2, the gain control voltage is produced by generating, in a dividing unit 27*c*, an output voltage which would represent an output of the optimum filter at time $t_i$ for input signal $u_i$ were training not being continued. The optimum filter voltage appears at the input to adder 20. It is applied to divider 27*c* by way of channel 27*d*. The divisor voltage appears at the input to adder 26. It is applied to divider unit 27*c* by way of conductor 27*e*. The output of divider 27*c* appears on line 27*f* and is applied to a subtraction unit 27*g*. The subtraction unit 27*g* produces an output which represents the difference between the voltage on line 27*f* and the present value of the desired output $z_i$ from unit 21. The output on line 27*h* is then applied to rectifier 27*i* and then to a filter 27*j*. As a result there appears on line 27*k* a gain control voltage which is a positive scaler function. It is applied to both amplifiers 23*b* and 27*b*.

In the specific circuit arrangement shown in FIG. 2 the gain control function $g(t)$ is a nonnegative function of the error $e'(t)$. The gain control function thus may be defined as follows:

$$g(t)=G[e'(t_i),\ t_i\leq t] \qquad (5)$$

where: $g(t)$ is the weighting function, $G$ is all representative functions, $e'(t_i)$ is the error at $t_i$ if the optimization is unchanged from the preceding interval.

$t_i$ is equal to or less than $t$, time $t$ being the instant at which the gain control function $g(t)$ is evaluated. If $a_i$ defines the optimum filter at $t_i$ and $u_i$ is the present value of the input, the following expression is definitive of the error.

$$\underline{e}'_i=\underline{z}_i-A_{i11}\underline{f}_i \qquad (6)$$

in which $\underline{f}_i=\Phi_{1i}x\Phi_{2i}x\ldots$ (the direct vector product). If $e_i$ is considered as a scaler function then equation (6) can be expressed as follows:

$$e'_i=z_i-\underline{a}_{i11}{}^T\underline{f}_i \qquad (7)$$

The error function, once determined, is then employed as a gain control function in a manner such as shown in FIG. 2.

In operation a voltage is placed on capacitor 51 each time it is addressed during training. Capacitor 51 in the storage unit 12 will have increments of charge supplied thereto each time it is addressed with such increment being dependent upon the quantity $x_{i11}$, the value $z_i$, and the weighting function $g_i$.

In contrast, the capacitors in storage unit 13 will be incremented, each time addressed, by a voltage representative of unity, i.e., the signal from source 27, and the weighting function $g_i$. Thus, the summation signal from adder 20 is normalized by dividing the signal by a voltage proportional to the number of times the given storage location has been addressed.

The switching unit represented by unit 92 having terminals 93 and 94 may be a conventional stepping switch which will complete its cycle in response to an input as from gate 90 in a time interval less than the period of the timer 37. Such units are well known and are commonly used.

The system shown in FIG. 2 involves only the two inputs $u_i$ and $x_{i11}$ for memory addressing purposes and utilizes only a single time delay 32 at the output. Where desired additional inputs can be employed, such as the signal $u_i-u_{i11}$ shown in FIG. 1.

An additional feedback with an additional time delay such as the delay 32′ may also be employed to provide a feedback of function $x_{i12}$. Additional delays may provide $x_{i13}$, $x_{i14}$, etc. Thus, while the system of FIG. 2 has been described in detail, it is not intended that the invention be limited to a system where analog elements are employed or where only two quantizers 11 and 14 are employed. As described in application Ser. No. 732,152 referred to above, a digital processor may be employed and in general may be preferred over analog systems. However, an analog structure has been shown in FIG. 2 in order to aid in understanding the invention because analog systems in general are fixed in space whereas digital machines are of variable configuration as a function of the control program and do not lend themselves to such illustration. An additional quantizer will be employed for each additional input and another quantizer will be employed for each additional feedback function employed.

It will be seen that, as to the input signal, the feedback employed in FIGS. 1 and 2 requires only consideration of the contemporary value of the elements of $\underline{u}$ and thus permits formulation of a nonlinear processor with minimal storage. It is from this fact that significant advantage over the Bose system is achieved.

FIG. 3

Further to aid in understanding the invention, the quantizers 11 and 14 may be of the type represented by FIG. 3. For example, if the source 10 is connected by way of an AND gate 10*a* as controlled by timer 37 then a voltage will be produced on only one of the lines 41—44 depending on the amplitude of the signal at the instant the timer opens gate 10*a*. The quantizer comprises three input transistors 101, 102 and 103. The bases of transistors 101—103 are signal energized through Zener diode units 104—106, respectively, all of which are connected to the output of gate 10*a*. The transistor 101 is connected at its emitter through resistor 107 to ground and to line 44. The emitter is also connected by way of resistor 108 to the base of transistor 109 which is connected in parallel with the transistor 110. The emitters of transistors 109 and 110 are connected to ground. The collectors are connected to line 43. The base of transistor 110 is connected to the collector of transistor 102 whose emitter is grounded, and to the base of a transistor 112. Line 43 is connected to the supply source $+V_c$ by way of resistor 113 and by way of resistor 114 to the collector of transistor 112. The juncture between resistors 113 and 114 is connected to the collector of transistor 101 and, by way of resistor 115, to line 42 which is common to the collectors of transistors 116 and 117. The base of transistor 116 is connected to the collector of transistor 112. The base of transistor 117 is connected by way of resistor 118 to line 41 and to the collector of transistor 103. The emitters of transistors 116 and 117 are connected to ground.

In operation, if the signal from unit 10*a* is less than the breakdown voltage of unit 106, transistor 103 is off, its collector is at the supply potential and thus line 41 is at high potential providing a "one" output. Since the collector of transistor 103 is at high potential, transistor 117 conducts, providing a voltage drop across resistor 115 so that line 42 is essentially at ground potential or "zero".

In a similar manner, transistors 101 and 102 are off. This means that the base of transistor 110 is at high potential thus conducting so that line 43 is substantially at ground potential. Since transistor 101 is not conducting, line 44 is likewise at ground potential.

When the input signal exceeds the breakdown potential of unit 106 but does not exceed the breakdown potential of units 104 and 105, transistor 103 conducts so that line 41 is at ground potential. Driving the base of transistor 117 to ground stops conduction therein so that line 42 is high. The circuit involving transistors 116 and 117 is a NOR circuit. Since transistor 102 is not conducting the transistor 112 is conducting so that its collector is substantially at ground causing transistor 116 to be nonconductive. Likewise, transistor 102 causes transistor 110 to conduct placing line 43 at ground potential. As before, transistor 101 is not conducting and line 44 remains at ground. Thus only line 42 is high.

The same circuit operation can now readily be visualized for the case where the signal exceeds the breakdown potential of unit 105 but not 104 and for the case where the input signal exceeds the breakdown potential of unit 104.

It will thus be seen that the thresholds, or breakdown potentials for units 104—106 are selected in dependence upon the desired quantizing levels.

FIGURE 4

As indicated in the table of FIG. 4, if the input voltage in FIG. 3 is less than the level $V_1$ of diode unit 106, then line 41 will be energized and the remainder of lines 42—44 will be deenergized. If the voltage is greater than $V_1$ and less than the level $V_2$ of diode unit 105, then line 42 only will be energized. If the voltage is greater than $V_2$ but less than the level $V_3$ of diode unit 104, then line 43 only will be energized. If the voltage is greater than $V_3$, then line 44 only will be energized. Diode units 104—106 are illustrated as Zener diodes. They differ one from another by their threshold voltages which satisfy the inequality $V_1<V_2<V_3$. They may comprise single diodes of different breakdown voltages or, as illustrated in FIG. 3, a multiplicity of like units in series.

FIGURE 5—IDENTIFICATION

Figure 5:
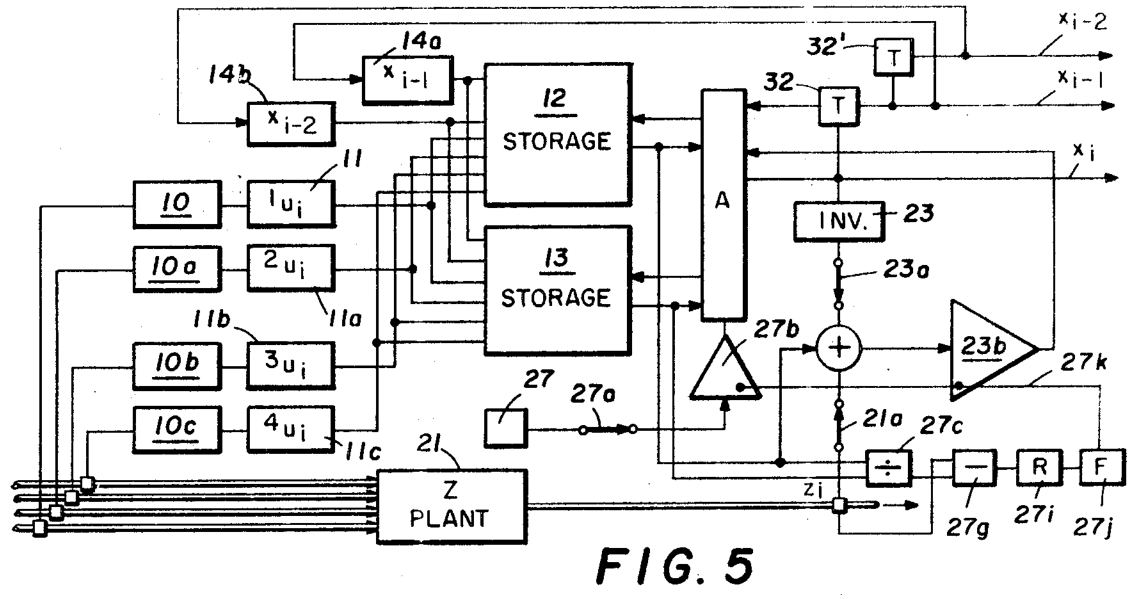
FIG. 5 illustrates a multi-input multifeedback processor in a plant identification environment.

The invention is useful in connection with an identification or simulation system illustrated such as in FIG. 5, wherein four inputs for signals ${}^1u_i$, ${}^2u_i$, ${}^3u_i$, and ${}^4u_i$ are quantized in units 11, 11*a*, 11*b*, 11*c*, respectively, and two feedback signals, $x_{i11}$, $x_{i12}$ are quantized by units 14*a* and 14*b*, respectively, for storage in units 12 and 13. In this case, the selection of a given address in the storage units would be dependent upon coincidence between the six inputs where the system is to be trained based upon the desired output *z* from source 21.

The processor of FIG. 5 corresponds generally with the processor of FIG. 1 in that the unit A includes units 24, 26 and 30 connected as in FIG. 1, shown for convenience as a single block in FIG. 5.

One application of the multi-input system is indicated in FIG. 5 wherein the desired output is the output from a plant 21 and the inputs to the quantizers correspond with and are derived from the four inputs to the plant 21. In this system, the processor is trained in real time in dependence upon the inputs to plant 21 and the output therefrom to simulate an output *x* which corresponds with the actual output *z* of the plant. As in FIG. 2, amplifiers 23*b* and 27*b* are supplied with a gain control voltage by way of channel 27*k*, the same being developed through the use of elements 27*c*, 27*g*, 27*i* and 27*j*.

Once trained, the switches 21*a*, 23*a* and 27*a* will be opened. In this condition, the four processor input signals may be varied at will to simulate an output *x* which would be representative of the output from the plant 21 for corresponding changes of the four input signals. In such case the response of the simulated plant to any particular change can be observed without the expenditure of time or energy necessary to effect such changes or to interfere with actual plant operation. Moreover, these observations can be effected on an accelerated time scale.

FIGURE 6—CLASSIFICATION

Figure 6:
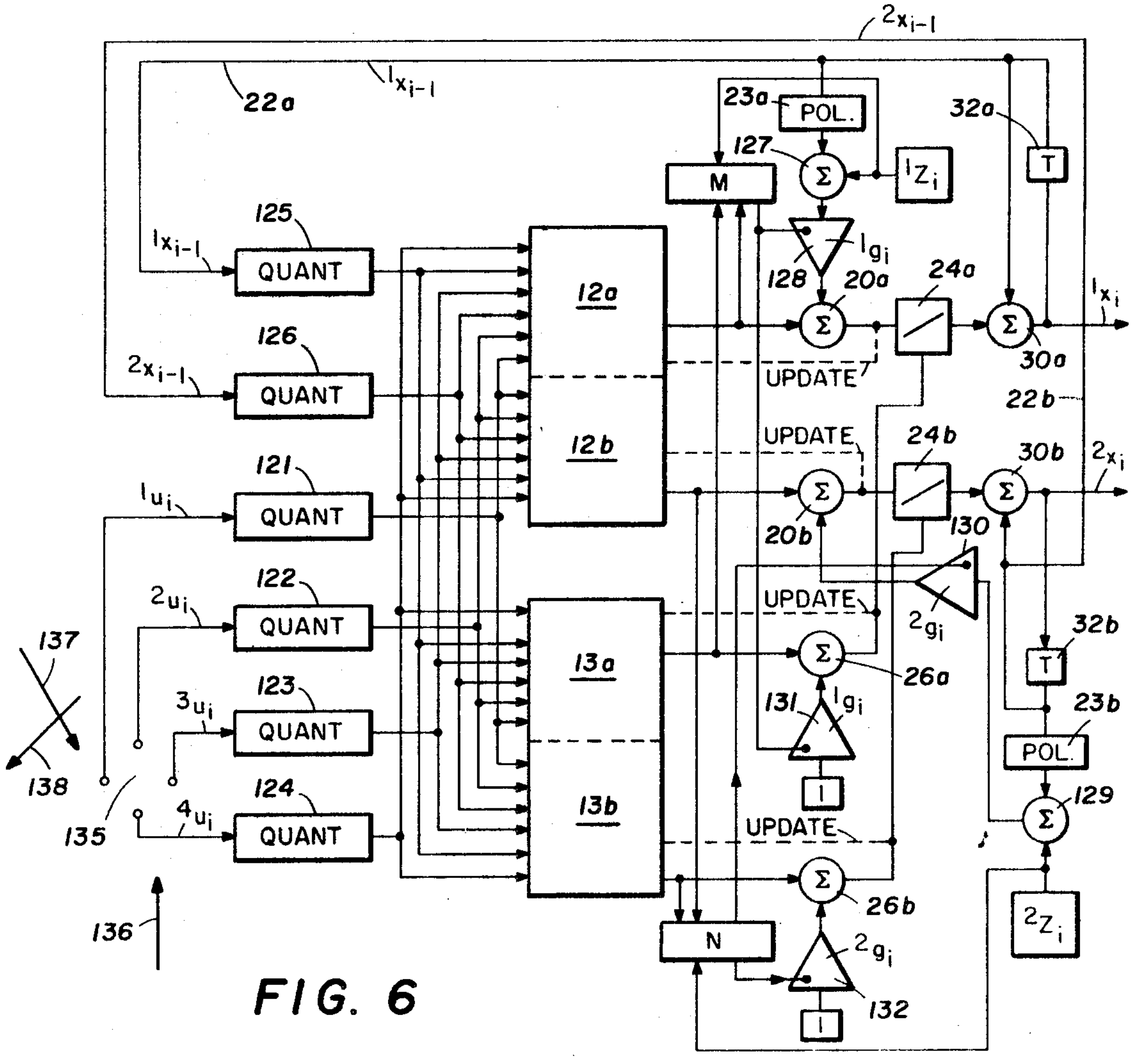
FIG. 6 illustrates a more general multi-input multioutput system embodying the invention operating in an adaptive sense.

FIG. 6 illustrates an embodiment of the present invention wherein a plurality of input signals are employed as well as a plurality of feedback signals and is further characterized by providing multiple outputs of a more general class than is possible in FIG. 5 but with adaptive weighting. In FIG. 5 multiple outputs can be obtained such as the outputs $x_i$, $x_{i11}$, $x_{i12}$, etc. It will be noted that the only signals applied to adders in FIG. 5 (the adders being shown in FIG. 1) are derived from units 21, 23 and 27. In FIG. 6, the two outputs ${}^1x_i$ and ${}^2x_i$ are contemporary values of the expectation of two desired outputs and may be completely independent. FIG. 6 is also more general in that it includes means for varying the strength of such signals comparable to the outputs of units 21, 23 and 27 in FIG. 5 to provide for selective emphasis of certain portions of the training operation over other portions of the training operation.

More particularly, in FIG. 6 input signals ${}^1u_i$, ${}^2u_i$, ${}^3u_i$, and ${}^4u_i$ are applied to quantizers 121—124 each of which addresses storage arrays 12*a*, 12*b* and storage arrays 13*a* and 13*b*. Quantizers 125, 126 similarly address each of storage arrays 12*a* and 12*b* and 13*a* and 13*b* in response to two feedback signals ${}^1x_{i11}$ and ${}^2x_{i11}$.

The signals retrieved from storage in response to addresses specified by the quantizers 121—126 are connected to adders as in FIG. 1 wherein feedback is employed. More particularly, the signal from storage array 12*a* is connected to adder 20*a* and the signal from storage array 12*b* is connected to adder 20*b*. The signal from storage array 13*a* is connected to adder 26*a* and the signal from storage array 13*b*, to adder 26*b*. The outputs of adders 20*a* and 26*a* are connected to divider 24*a*. The outputs of adders 20*b* and 26*b* are connected to divider 24*b*. The outputs of dividers 24*a* and 24*b* are connected to adders 30*a* and 30*b* respectively to provide the output signals ${}^1x_i$ and ${}^2x_i$, respectively. The output signal ${}^1x_i$ is applied to a delay unit 32*a* while the output ${}^2x_i$ is applied to delay unit 32*b*. The signal ${}^1x_{i11}$ is thus applied by way of conductor 22*a* to quantizer 125, to the second input of adder 30*a* and to a polarity inverter unit 23*a*. Similarly the output signal ${}^2x_{i11}$ is connected to the second input of adder 30*b* and by way of conductor 22*b* to quantizer 126 and to a polarity inverting unit 23*b*.

The output of polarity inverter unit 23*a* and the desired signal ${}^1z_i$ are connected to an adder 127 whose output is connected to the input of a variable gain amplifier 128 having a gain function ${}^1g_i$. The output of amplifier 128 is connected to the second input of adder 20*a*. Similarly, the output of complementing unit 23*b*and the desired signal ${}^2z_i$ are connected to the inputs of adder 129 whose output is connected to the input of a variable gain amplifier 130. The gain of amplifier 130 is indicated as corresponding with the function ${}^2g_i$. The output of amplifier 130 is connected to the second input of adder 20*b*. The incrementing signals applied to adders 26*a* and 26*b* similarly are maintained under the control of amplifiers 131 and 132, the gains of which are ${}^1g_i$ and ${}^2g_i$, respectively. A gain control unit M is provided as to generate the gain control function ${}^1g_i$. A gain control unit N is provided for generating the gain control function ${}^2g_i$. Units M and N may each have components corresponding to units 27*c*, 27*g*, 27*i* and 27*j* of FIG. 2. They have been lumped together in block form for simplicity in FIG. 6.

The system of FIG. 6, in general, will operate in the manner above described in connection with FIGS. 1 and 2. The multiinput and multioutput operation may find application in a number of different physical problems. One such problem has been indicated in FIG. 6 as comprising the identification of and distinction between two different classes of seacrafts as they travel through the region occupied by a given listening station. More particularly, the system may comprise an array 135 of marine acoustic sensors located along a waterway. The four signals from the sensors thus comprise the inputs to the quantizers 121—124. During training the desired output signal $^1z_i$ would be unity while periodically sampling the outputs from the array 135 as tugs are observed to travel along a plurality of paths 136, 137 and 138. During this training interval the desired output signal $^2z_i$ will be zero. Further, training would be carried out wherein the second desired output signal $^2z_i$ would be unity while sampling the output signals from the array 135 while detecting signals from a different class of crafts such as boats driven by an outboard motor are observed in the area of the array 135. Training would be carried out during time intervals when the craft travel at different headings and different speeds and with different species of the class of motors involved. During this training interval the desired output signal $^1z_i$ is zero.

The signals from amplifiers 128, 130, 131 and 132 would be used only in training. Therefore, the system would operate in response to various signals detected by the array 135. Whenever a craft of the first class passes the array 135 the output $^1x_i$ would be of unity value, for example, and otherwise would be zero. Whenever a craft of the second class is in the region of the array 135, the second output $^2x_i$ would be unity but otherwise zero. If craft from both classes were present then both outputs would be unity. Thus the outputs $^1x_i$ and $^2x_i$ would provide for classification of the character of the vessels in the region of the array 135.

The foregoing example has been given by way of illustration and is intended to indicate the versatility of the processor and its operation and is not in any way limited to the particular environment, to the number of inputs employed, nor to the number of feedback elements incorporated in its operation.

It will be appreciated that if $^1g_i$ is equal to $^2g_i$ then the storage array **13*b* could be eliminated along with the amplifier 132 and the adder 26*b*. In such case the output of adder 26*a* would be connected to both dividers 24*a* and 24*b***.

In a digital system such as illustrated in FIG. 7 of application Ser. No. 732,152 referred to above, the input $u$ may be stored on a magnetic tape with the successive words on the tape representing, in digital code, the amplitude of a given input function such as for example a seismogram. The function $z$ may be similarly stored on a tape with the successive words representing the desired output of a filter to which the input signal $u$ is to be applied. The error-dependent gain control described herein preferably will be employed in such system where nonstationary operations are to be processed.

As above noted, classes of operations to which the optimal nonlinear processor is applicable include identification or simulation, control, filtering, smoothing, prediction, modeling, classification. The adaptive weighting described above may be employed in any or all such processing operations.

Now that the invention as embodied in different forms has been described in different fields of use it will be appreciated that the method and system have general applicability. It will be appreciated that the invention may be employed where the processor is a programmed general purpose digital computer operating in accordance with the teachings herein, or a special purpose digital computer such as disclosed in FIG. 7 of application Ser. No. 732,152 since analog operations may in general be carried out effectively in digital form. In any case, the enhancement of operation economy during the training phase provided by the present invention will be found to overcome the inertia built up over long training intervals.

It is therefore to be understood that the foregoing description is to be taken as exemplary. In most instances, the preferred mode of carrying out the invention is in the digital form but in general will be dependent upon the particular task to which the invention is to be applied. The nature of the various components of the system of FIG. 1 may be varied depending upon the particular use of the invention. FIG. 2 illustrates an analog storage array. In digital operations magnetic storage arrays, as conventionally used in digital systems, may also be employed as well as other well-known storage systems. The summation units 20, 26, and 30 may be of conventional type. In digital operations they would comprise the digital counterpart of the analog, as is well known in the art. Division as in divider 24 is well known and may be carried out as described by R. K. Richards in Arithmetic Operations in Digital Computers, Van Nostrand, 1955, pages 136—165. Time delay unit 32 may comprise a magnetic delay line for either analog or digital operations or may comprise a storage register which will receive and hold a digital word for one sample interval as shown at page 153 of the Richards text. The system components employed in the various drawings, therefore, are, in general, well known and understood. It is the organization of the present system which provides for adaptive weighting in feedback optimation of a processor. In all cases herein, including the procedures, apparatus, and manipulative steps described or specified, it is to be understood that they are of nonanimal character or carried out by nonanimal means.

Having described the invention in connection with certain specific embodiments thereof, it is to be understood that further modifications may now suggest themselves to those skilled in the art and it is intended to cover such modifications as fall within the scope of the appended claims.

What I claim is:

1. The method of adapting weighting with an optimum filter during training on training functions including at least one system input signal to minimize inertia to response after long training which comprises:

generating an error signal representative of the difference between the actual response of the filter to said training functions including said input signal and the desired response, and controlling the contribution in the contemporary training of said filter of those of said training functions other than said input signal in dependence upon said error signal.

2. The method of claim 1 wherein said training functions other than said input signal are amplified and said error signal is applied to control the gain of said amplifiers to produce high gain for large error signals.

3. The method of claim 1 wherein said system input signal includes a plurality of time-spaced components of the same time-varying function.

4. The method of adaptive weighting of an optimal nonlinear signal processor during training thereof where time samples of an input signal $u$ are quantized to produce successive groups of operating functions for controlling gating operations to produce independent-gated output signals each dependent upon a contemporary input signal $u_i$ and summing signals consisting of the previous output signal $x_{i\text{-}1}$ and a second signal $z_i$ representative of the desired contemporary value of the response of the processor to the contemporary and past values of $u$ to produce a summation signal which:

i. replaces the independent-gated output signal and ii. is normalized to produce the contemporary value of the output signal $x_i$ with the previous output signal $x_{i\text{-}1}$ quantized to produce a second of the groups of said functions to control said gating operation, comprising the steps of:

a. generating an error signal representative of the difference between the normalization of each of said gated output signals and the corresponding desired processor output and b. controlling the contribution of said summing signals to said output signal in dependence upon said error signal.

5. The method of adaptively weighting the training of a processor to produce a processed output signal optimally and nonlinearly from a first signal of a class of signals having similar statistics where, in a training phase, successive time samples of a training input signal are quantized to produce successive groups one member of each group comprising at least two operating signals partly to control a gating operation which produces an independent-gated training signal for combining with a contemporary sample of the desired output signal and previous processed output signal to produce a training summation signal, which signal then i. replaces the independent-gated training signal, and ii. is normalized to form the contemporary sample of said processed output signal and where the previous sample of the processed output signal is quantized to produce a second member of each of the groups of said operating signals to control the gating operation, comprising generating an electrical quantity representative of the difference between said gated training signal and the desired processor output signal, and automatically controlling the amplitude of said contemporary sample of said desired output signal in proportion to and in response to said electrical quantity.

6. A system for adaptive weighting of an optimum filter during training on training functions including at least one system input signal to minimize inertia to response after long training which comprises:

a. comparator means for generating an electrical signal representative of the difference between the actual response of the processor to said training functions including said input signal and the desired response, b. amplifier means for those of said training functions other than said input signal, and c. means for applying said electrical signal to said amplifier means to change the gain of said amplifier in the same sense as changes in said electrical signal to control the contribution in the subsequent training of said processor of said training functions other than said input signal.

7. In an optimal nonlinear signal processor where during training time samples of an input signal $u$ are quantized to produce successive groups of operating functions for partly controlling gating operations to produce independent-gated output signals each dependent upon a contemporary input signal $u_i$ and summing signals consisting of the previous output signal $x_{i11}$ and a second signal $z_i$ representative of the desired contemporary value of the response of the processor to the contemporary and past values of $u$ to produce a summation signal which:

i. replaces the independent-gated output signal and ii. is normalized to produce the contemporary value of the output signal $x_i$ with the previous output signal $x_{i11}$ quantized to produce a second of the groups of said functions to control said gating operation, the combination comprising a. means for generating an error signal representative of the difference between the normalization of each of said gated output signals and the corresponding desired processor output and b. means for controlling the contribution of said summing signals to said output signal in dependence upon said error signal.

8. The combination set forth in claim 7 in which means are provided for normalizing said gated output signal and for subtracting the normalized output signal from said second signal $z_i$ to produce said error signal.